United States Patent
Phlegm et al.

(10) Patent No.: US 12,315,891 B2
(45) Date of Patent: May 27, 2025

(54) APPARATUS AND METHOD FOR CONSTANT PRESSURE REGULATION OF ONE OR MORE BATTERY CELLS

(71) Applicant: GM GLOBAL TECHNOLOGY OPERATIONS LLC, Detroit, MI (US)

(72) Inventors: Herman K. Phlegm, West Bloomfield, MI (US); Srikanth Arisetty, Novi, MI (US); Rajesh K. Bhagirath, Lasalle (CA); Edgar P. Calderon, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 397 days.

(21) Appl. No.: 17/695,985

(22) Filed: Mar. 16, 2022

(65) Prior Publication Data
US 2023/0299365 A1   Sep. 21, 2023

(51) Int. Cl.
*H01M 10/42* (2006.01)
*H01M 10/48* (2006.01)
*H01M 50/367* (2021.01)

(52) U.S. Cl.
CPC ..... *H01M 10/4207* (2013.01); *H01M 10/482* (2013.01); *H01M 50/367* (2021.01)

(58) Field of Classification Search
None
See application file for complete search history.

(56) References Cited

U.S. PATENT DOCUMENTS

2023/0296676 A1*  9/2023  Brecht ............... H01M 10/425
                                                       429/90

* cited by examiner

*Primary Examiner* — Amanda J Barrow
(74) *Attorney, Agent, or Firm* — Quinn IP Law

(57) ABSTRACT

A method for constant pressure regulation of battery cells includes disposing the cells in a stacked arrangement within a battery cell placement volume of an apparatus configured to maintain a constant pressure on the cells, providing a gas pressure within a chamber of the apparatus, thereby causing an initial pressure to be applied on the battery cells, and detecting an expansion of the battery cells during a predetermined timespan using a linear displacement sensor. During the predetermined timespan, if the detected expansion is less than a maximum allowable expansion minus a predetermined measurement error, then the gas pressure within the chamber is increased, and if the detected expansion is greater than the maximum allowable expansion plus the predetermined measurement error, then the gas pressure within the chamber is decreased. An apparatus for constant pressure regulation of battery cells is also provided.

13 Claims, 2 Drawing Sheets

APPARATUS AND METHOD FOR CONSTANT PRESSURE REGULATION OF ONE OR MORE BATTERY CELLS

INTRODUCTION

The present disclosure relates to apparatus and methods for applying and maintaining constant pressure on one or more battery cells.

Electric batteries customarily include a plurality of interconnected battery cells, which may be provided in pouch or prismatic form. During periods of charging and discharging, battery cells may swell (expand) or shrink (contract), due to the interaction of the electrochemical compounds within the cells. In order to accommodate this expansion and contraction of the battery cells, foam pads or spacers may be provided between the cells.

SUMMARY

According to one embodiment, an apparatus for constant pressure regulation of one or more battery cells includes a bottom plate having a top surface, a top plate having opposed upper and lower surfaces and being disposed above and parallel to the bottom plate, wherein the top plate is configured for constrained movement toward and away from the bottom plate, and wherein a battery cell placement volume is defined between the top surface of the bottom plate and the lower surface of the top plate. A support structure is provided having a lowermost surface with a pocket defined in the lowermost surface, wherein the top plate is fitably disposed within the pocket with the pocket and the upper surface of the top plate defining a chamber, wherein the top plate is sealably and vertically slidable against inner side walls of the pocket. A passageway is defined within the support structure in fluid communication between the chamber and a port disposed on an external surface of the support structure, and a pressure-regulated gas supply is provided in fluid communication with the port for supplying gas to the chamber and producing a gas pressure within the chamber. A linear displacement sensor is operatively connected to the top plate for measuring a vertical displacement of the top plate and is configured to produce a displacement signal indicative of the vertical displacement. A controller is also provided, which is configured for receiving the displacement signal and for sending an actuation signal to the pressure-regulated gas supply for increasing or decreasing the gas pressure within the chamber.

The vertical displacement of the top plate is indicative of an expansion of the one or more battery cells when the one or more battery cells are disposed within the battery cell placement volume. The pressure-regulated gas supply and the controller may be configured for maintaining a constant gas pressure within the chamber, and the pressure-regulated gas supply may include a pressure regulator and a pressurized gas source. The linear displacement sensor may be a linear variable differential transformer, and may be operatively connected to a shaft which sealably extends through an uppermost surface of the support structure and which is attached to the top plate within the chamber. Alternatively, the linear displacement sensor may be disposed on or adjacent to an outermost side surface of the support structure and may be operatively connected to a connecting member which is attached to the top plate. The apparatus may further include a pressure relief valve disposed in fluid communication with the passageway for releasing gas from the chamber when the gas pressure is greater than a maximum allowable pressure.

The controller may include instructions, wherein after the one or more cells are disposed in a stacked arrangement within the battery cell placement volume and an initial pressure is applied on the one or more cells by the gas pressure in the chamber, the instructions may be executable for: (i) detecting an expansion E of the one or more battery cells during a predetermined timespan T using the linear displacement sensor; (ii) if during the predetermined timespan T the detected expansion E is less than a maximum allowable expansion $E_{max}$ minus a predetermined measurement error $\Delta$, then increasing the gas pressure within the chamber; and (iii) if during the predetermined timespan T the detected expansion E is greater than the maximum allowable expansion $E_{max}$ plus the predetermined measurement error $\Delta$, then decreasing the gas pressure within the chamber. The instructions may be further executable for: (iv) if during the predetermined timespan T the detected expansion E is greater than a critical expansion amount, thereby defining a critical event, then providing one or more signals indicative of the critical event.

According to another embodiment, an apparatus for constant pressure regulation of one or more battery cells includes: (i) a fixed bottom plate having a top surface; (ii) a moveable top plate having opposed upper and lower surfaces and being disposed above and parallel to the bottom plate, wherein the top plate is configured for constrained movement toward and away from the bottom plate, and wherein a battery cell placement volume is defined between the top surface of the bottom plate and the lower surface of the top plate; (iii) a fixed support structure having a lowermost surface with a pocket defined in the lowermost surface, wherein the top plate is fitably disposed within the pocket with the pocket and the upper surface of the top plate defining a chamber, wherein the top plate is sealably and vertically slidable against inner side walls of the pocket; (iv) a passageway defined within the support structure in fluid communication between the chamber and a port disposed on an external surface of the support structure; (v) a pressure-regulated gas supply in fluid communication with the port for supplying gas to the chamber and producing a gas pressure within the chamber; (vi) a pressure relief valve disposed in fluid communication with the passageway for releasing gas from the chamber when the gas pressure is greater than a maximum allowable pressure; (vii) a linear displacement sensor operatively connected to the top plate for measuring a vertical displacement of the top plate and configured to produce a displacement signal indicative of the vertical displacement; and (viii) a controller configured for receiving the displacement signal and for sending an actuation signal to the pressure-regulated gas supply for increasing or decreasing the gas pressure within the chamber; (ix) wherein the pressure-regulated gas supply and the controller are configured for maintaining a constant gas pressure within the chamber.

The controller may include instructions, wherein after the one or more cells are disposed in a stacked arrangement within the battery cell placement volume and an initial pressure is applied on the one or more cells by the gas pressure in the chamber, the instructions are executable for: (i) detecting an expansion E of the one or more battery cells during a predetermined timespan T using the linear displacement sensor; (ii) if during the predetermined timespan T the detected expansion E is less than a maximum allowable expansion $E_{max}$ minus a predetermined measurement error Δ, then increasing the gas pressure within the chamber; and (iii) if during the predetermined timespan T the detected expansion E is greater than the maximum allowable expansion $E_{max}$ plus the predetermined measurement error Δ, then decreasing the gas pressure within the chamber. The instructions may be further executable for: (iv) if during the predetermined timespan T the detected expansion E is greater than a critical expansion amount, thereby defining a critical event, then providing one or more signals indicative of the critical event.

According to yet another embodiment, a method for constant pressure regulation of one or more battery cells includes: (a) disposing the one or more battery cells in a stacked arrangement within a battery cell placement volume of an apparatus configured to maintain a constant pressure on the one or more battery cells; (b) providing a gas pressure within a chamber of the apparatus, thereby causing an initial pressure to be applied on the one or more battery cells; (c) detecting an expansion E of the one or more battery cells during a predetermined timespan T using a linear displacement sensor; (d) if during the predetermined timespan T the detected expansion E is less than a maximum allowable expansion $E_{max}$ minus a predetermined measurement error Δ, then increasing the gas pressure within the chamber; and (e) if during the predetermined timespan T the detected expansion E is greater than the maximum allowable expansion $E_{max}$ plus the predetermined measurement error Δ, then decreasing the gas pressure within the chamber.

The method may further include repeating steps (c), (d) and (e) for a plurality of cycles. The method may also include: if during the predetermined timespan T the gas pressure is greater than a maximum allowable pressure, then releasing gas from the chamber until the gas pressure is at or below the maximum allowable pressure. Additionally, the method may include: if during the predetermined timespan T the detected expansion E is greater than a critical expansion amount, thereby defining a critical event, then providing one or more signals indicative of the critical event.

In this method, the maximum allowable expansion $E_{max}$ may be a function of at least one of a state of charge of the one or more battery cells, a state of health of the one or more battery cells, and a battery chemistry of the one or more battery cells. Additionally, during the predetermined timespan T, the one or more battery cells may be in a charging state or a discharging state. Further, the apparatus used in this method may include: (i) a bottom plate having a top surface; (ii) a top plate having opposed upper and lower surfaces and being disposed above and parallel to the bottom plate, wherein the top plate is configured for constrained movement toward and away from the bottom plate, and wherein the battery cell placement volume is defined between the top surface of the bottom plate and the lower surface of the top plate; (iii) a support structure having a lowermost surface with a pocket defined in the lowermost surface, wherein the top plate is fitably disposed within the pocket with the pocket and the upper surface of the top plate defining the chamber, wherein the top plate is sealably and vertically slidable against inner side walls of the pocket; (iv) a passageway defined within the support structure in fluid communication between the chamber and a port disposed on an external surface of the support structure; (v) a pressure-regulated gas supply in fluid communication with the port for supplying gas to the chamber and producing the gas pressure within the chamber; (vi) a linear displacement sensor operatively connected to the top plate for measuring a vertical displacement of the top plate and configured to produce a displacement signal indicative of the vertical displacement; and (vii) a controller configured for receiving the displacement signal and for sending an actuation signal to the pressure-regulated gas supply for increasing or decreasing the gas pressure within the chamber.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
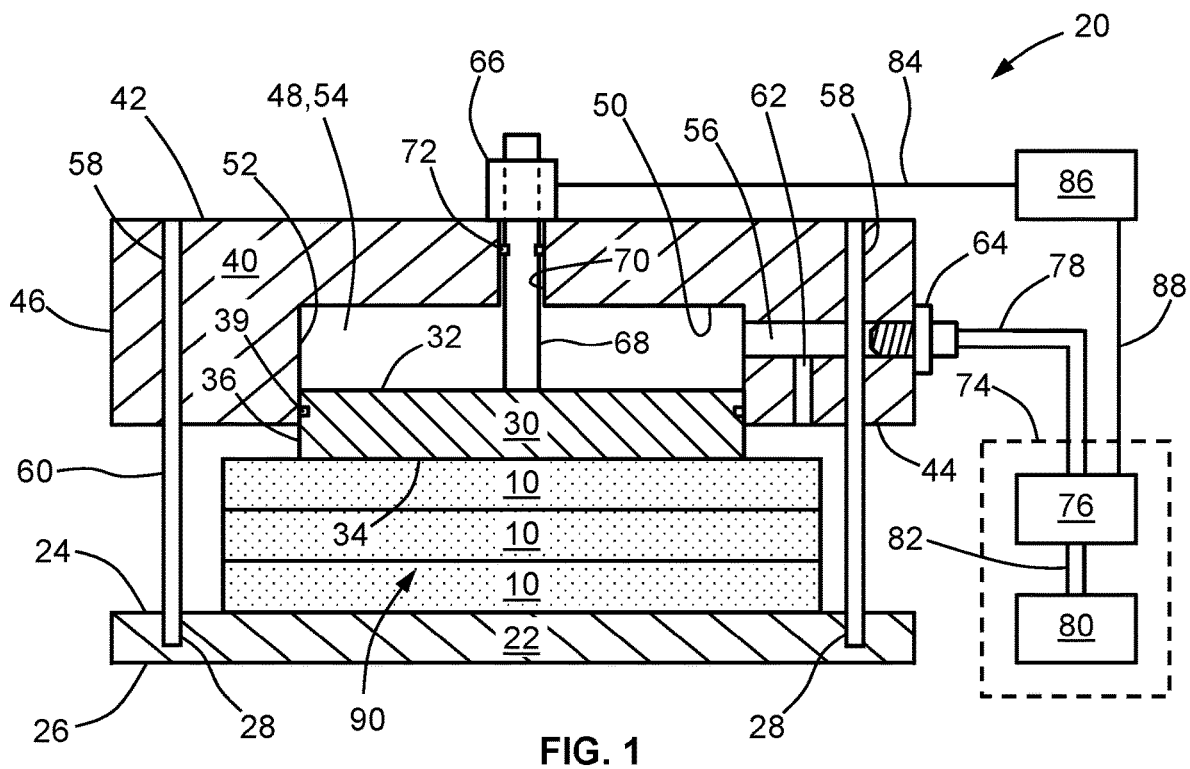
FIG. 1 is a schematic view of a first embodiment of an apparatus for constant pressure regulation of one or more battery cells.

Referring now to the drawings, wherein like numerals indicate like parts in the several views, an apparatus 20 for constant pressure regulation of one or more battery cells 10, and an associated method 100 for constant pressure regulation of one or more battery cells 10, are shown and described herein.

The apparatus 20 and method 100 of the present disclosure may be used to maintain a constant pressure on one or more stacked battery cells 10, even though the cells 10 may be expanding (or contracting) due to the cells 10 being charged or discharged, or due to other factors. The apparatus 20 and method 100 may be utilized during testing and calibration of the battery cells 10, as well as while the battery cells 10 are in service (such as in an automotive vehicle). As used herein, the cells 10 being "stacked" or arranged in a "stacked arrangement" may include one or more of such cells 10, and wherein if there are two or more cells 10 then the cells 10 may be vertically stacked one upon another. This stacking or stacked arrangement may be used for pouch cells, prismatic cells and any other configuration in which the individual cells 10 may be vertically stacked upon each other. Also, as used herein, the "expansion" of the cells 10, sometimes also denoted herein by the reference numeral "E", may be any change in the measured vertical height of the stacked cells 10, and thus may denote an expansion of the height (and of the cells 10) or a contraction of the height (and of the cells 10).

Figure 2:
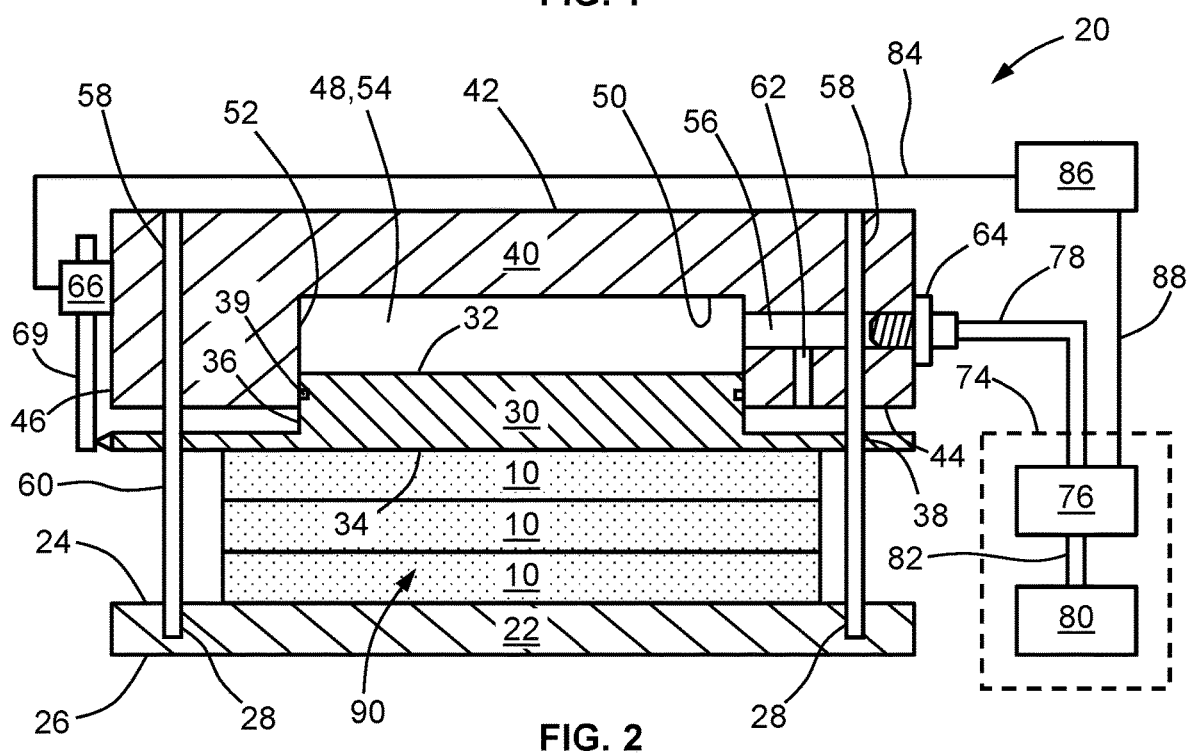
FIG. 2 is a schematic view of a second embodiment of an apparatus for constant pressure regulation of one or more battery cells.
Figure 3:
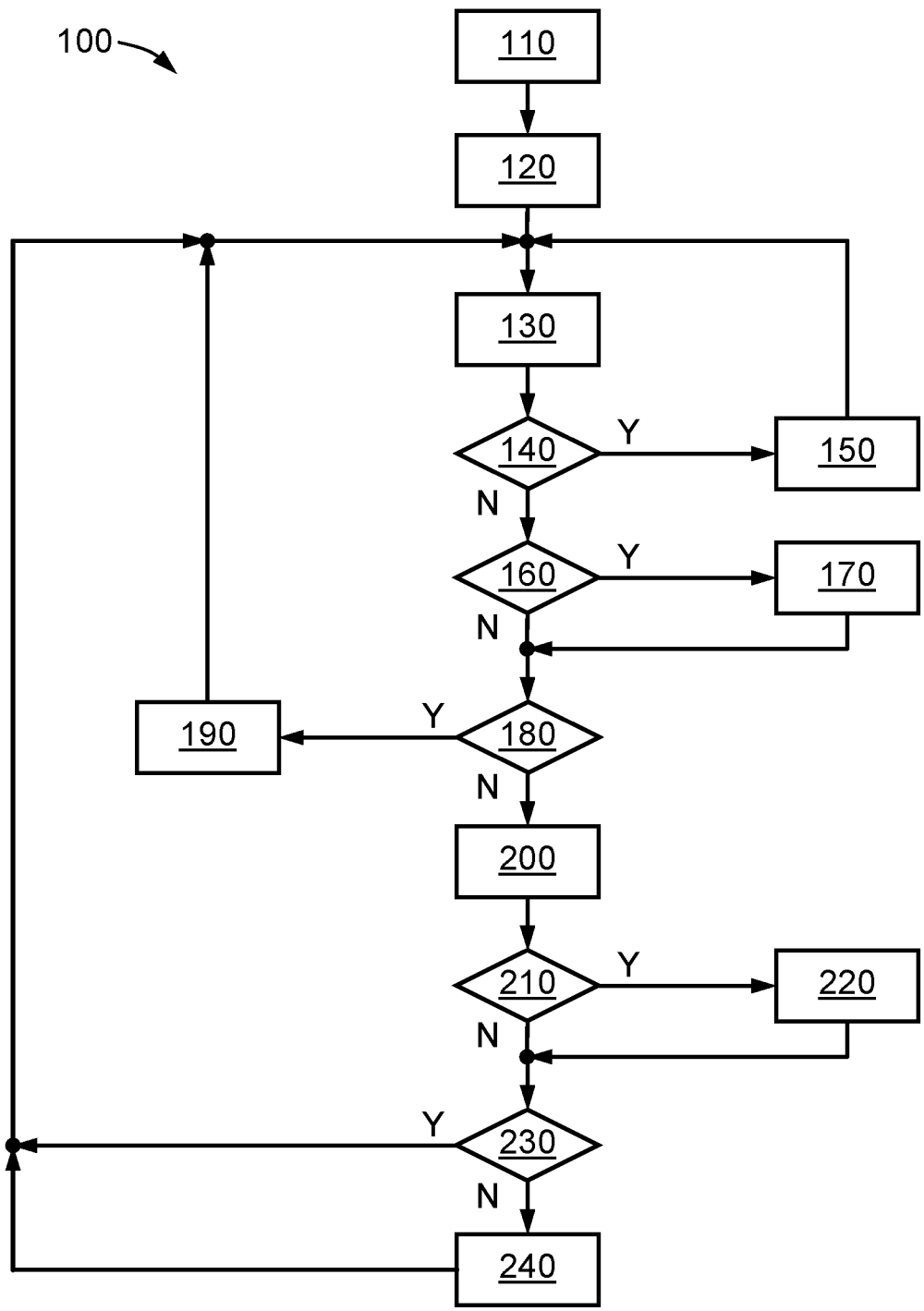
FIG. 3 is a flowchart for a method for constant pressure regulation of one or more battery cells.

FIGS. 1-2 show schematic views of two different embodiment of the apparatus 20, and FIG. 3 shows a flowchart for the associated method 100. In both embodiments, the apparatus 20 includes a bottom plate 22 having opposed top and bottom surfaces 24, 26 and a first set of guide holes 28 therein, and a top plate 30 having opposed upper and lower surfaces 32, 34 and outer side surfaces 36, with the top plate 30 being disposed above and parallel to the bottom plate 22. The bottom plate 22 may be characterized as being relatively fixed (e.g., attached to or resting upon some fixed surface), while the top plate 30 may be characterized as being relatively moveable with respect to the fixed bottom plate 22. Note that in the first embodiment the top plate 30 does not have any guide holes because its lateral width does not extend out wide enough to have any guide holes therein, whereas in the second embodiment the top plate 30 is much wider and does include a second set of guide holes 38 therein, which vertically align with the first set of guide holes 28 in the bottom plate 22.

The top plate 30 is configured for constrained vertical movement toward and away from the bottom plate 22 (i.e., upward and downward). A battery cell placement volume 90 is defined between the top surface 24 of the bottom plate 22 and the lower surface 34 of the top plate 30, with the size and volume thereof being variable and dependent upon the spacing between the top and bottom plates 30, 22. The battery cell placement volume 90 may serve as a place where the one or more battery cells 10 may be positioned and stacked.

The constrained vertical movement of the top plate 30 may be facilitated in concert with a support structure 40, which generally lies above the top plate 30. The support structure 40 has opposed uppermost and lowermost surfaces 42, 44 and outermost side surfaces 46, with a pocket 48 defined in the lowermost surface 44. The pocket 48 is defined and bounded by a roof 50 and inner side walls 52. The top plate 30 is fitably disposed within the pocket 48, with the pocket 48 and the upper surface 32 of the top plate 30 defining a chamber 54. Note that the size or volume of the chamber 54 will vary as the top plate 30 slides vertically upward and downward within the pocket 48. The top plate 30 is sealably and vertically slidable against the inner side walls 52 of the pocket 48; i.e., the outer side surfaces 36 of the top plate 30 may fit within and slide against the inner side walls 52 of the pocket 48, with a first seal 39 being seated within a groove about the outer side surfaces 36 of the top plate 30. The support structure 40 further includes a third set of guide holes 58, which vertically align with the first set of guide holes 28 in the first embodiment, and with the first and second sets of guide holes 28, 38 in the second embodiment. Correspondingly, a set of guides or guide rails 60 is fitably disposed within the sets of guide holes 28, 38, 58 in order to facilitate the vertical movement of the top plate 30.

A passageway 56 is defined within the support structure 40 in fluid communication between the chamber 54 and a port 64 that is disposed on an external surface of the support structure 40. (This external surface may be the outermost side surface 46 as illustrated in the drawings, or it may be the uppermost or lowermost surface 42, 44.) A pressure-regulated gas supply 74 is provided in fluid communication with the port 64 for supplying gas to the chamber 54 and for producing a gas pressure within the chamber 54. The gas may be air, nitrogen or any other suitable gas. A linear displacement sensor 66, such as a linear variable differential transformer (LVDT), is operatively connected to the top plate 30 for measuring a vertical displacement of the top plate 30, and is configured to produce a displacement signal 84 indicative of the vertical displacement. The linear displacement sensor 66 may be operatively connected to a shaft 68 which sealably extends through the uppermost surface 42 of the support structure 40 and which is attached to the top plate 30 within the chamber 54, as illustrated in the first embodiment of FIG. 1. A vertical borehole 70 may be defined through the support structure 40, with the borehole 70 and the shaft 68 being sized and shaped so as to facilitate sealable sliding vertical movement of the shaft 68 within the borehole 70. A second seal 72 may be seated within a groove around the circumference or outer perimeter of the shaft 68. Alternatively, as shown in FIG. 2, the linear displacement sensor 66 may be disposed on or adjacent to an outermost side surface 46 of the support structure 40, and may be operatively connected to a connecting member 69 which is attached to the top plate 30. In either embodiment, the vertical displacement of the top plate 30, as detected by the linear displacement sensor 66, is indicative of an expansion of the one or more battery cells 10 when they are disposed within the battery cell placement volume 90, and are being charged or discharged.

A controller 86 is also provided, which is configured for receiving the displacement signal 84 and for sending an actuation signal 88 to the pressure-regulated gas supply 74 for increasing or decreasing the gas pressure within the chamber 54. The pressure-regulated gas supply 74 and the controller 86 may be configured for maintaining a constant gas pressure within the chamber 54, such as by using the displacement signal 84 and the actuation signal 88. The pressure-regulated gas supply 74 may include a pressure regulator 76 and a pressurized gas source 80, such as a gas compressor and a gas tank. The pressure regulator 76 may be connected to the port 64 by a gas inlet/outlet conduit 78 and to the pressurized gas source 80 by a connecting pipe 82. Thus, the pressure regulator 76 may be disposed in fluid communication with the chamber 54 via the gas inlet/outlet conduit 78, the port 64 and the passageway 56, such that the pressure regulator 76 may maintain the gas pressure P within the chamber 54 at a commanded level. The apparatus 20 may further include a pressure relief valve 62 disposed in fluid communication with the passageway 56 (and therefore in fluid communication with the chamber 54 as well) for releasing gas from the chamber 54 when the gas pressure P is greater than a maximum allowable pressure $P_{max}$.

The controller 86 may be any suitable programmable or programmed device which may include instructions that are executable over one or more predetermined timespans T. (The predetermined timespan T may be a function of the clock speed of the controller 86, or it may be set to any arbitrarily selected duration of time, such as 10 milliseconds, 100 milliseconds, 1 second, 10 seconds, etc.) After the one or more cells 10 are disposed in a stacked arrangement within the battery cell placement volume 90 and an initial pressure is applied on the one or more cells 10 by the gas pressure in the chamber 54, the instructions may be executed for: (i) detecting an expansion E of the one or more battery cells 10 during a predetermined timespan T using the linear displacement sensor 66; (ii) increasing the gas pressure within the chamber 54 (and thereby increasing the pressure exerted by the top plate 30 on the stacked arrangement of the one or more cells 10), if during the predetermined timespan T the detected expansion E is less than a maximum allowable expansion $E_{max}$ minus a predetermined measurement error $\Delta$; and (iii) decreasing the gas pressure within the chamber 54 (and thereby decreasing the pressure exerted by the top plate 30 on the stacked arrangement of the one or more cells 10), if during the predetermined timespan T the detected expansion E is greater than the maximum allowable expansion $E_{max}$ plus the predetermined measurement error $\Delta$. The predetermined measurement error $\Delta$ may include measurement errors observed, and tolerances known or observed, in connection with the linear displacement sensor 66 and other equipment or elements. (Note that the predetermined measurement error $\Delta$ may optionally be arbitrarily set to zero.) The instructions may be further executable for: (iv) providing one or more signals indicative of a critical event, if during the predetermined timespan T the detected expansion E is greater than a critical expansion amount $E_{crit}$ (thereby defining the critical event). Note that the maximum allowable expansion $E_{max}$ and the critical expansion amount Emit may be determined based on at least one of a state of charge of the one or more battery cells 10, a state of health of the one or more battery cells 10, and a battery chemistry of the one or more battery cells 10. It may also be noted that if the detected expansion E exceeds the critical expansion amount $E_{crit}$, this may indicate a possible thermal runaway event; in this situation, the one or more signals provided that are indicative of this event may include audio signals (e.g., a beeping alarm), visual signals (e.g., a blinking light or a message displayed on a display screen), vibratory signals, and the like.

According to another embodiment, an apparatus 20 for constant pressure regulation of one or more battery cells 10 includes: (i) a fixed bottom plate 22 having a top surface 24; (ii) a moveable top plate 30 having opposed upper and lower surfaces 32, 34 and being disposed above and parallel to the bottom plate 22, wherein the top plate 30 is configured for constrained movement toward and away from the bottom plate 22, and wherein a battery cell placement volume 90 is defined between the top surface 24 of the bottom plate 22 and the lower surface 34 of the top plate 30; (iii) a fixed support structure 40 having a lowermost surface 44 with a pocket 48 defined in the lowermost surface 44, wherein the top plate 30 is fitably disposed within the pocket 48 with the pocket 48 and the upper surface 32 of the top plate 30 defining a chamber 54, wherein the top plate 30 is sealably and vertically slidable against inner side walls 52 of the pocket 48; (iv) a passageway 56 defined within the support structure 40 in fluid communication between the chamber 54 and a port 64 disposed on an external surface of the support structure 40; (v) a pressure-regulated gas supply 74 in fluid communication with the port 64 for supplying gas to the chamber 54 and for producing the gas pressure P within the chamber 54; (vi) a pressure relief valve 62 disposed in fluid communication with the passageway 56 for releasing gas from the chamber 54 when the gas pressure P is greater than a maximum allowable pressure $P_{max}$; (vii) a linear displacement sensor 66 operatively connected to the top plate 30 for measuring a vertical displacement of the top plate 30 and configured to produce a displacement signal 84 indicative of the vertical displacement; and (viii) a controller 86 configured for receiving the displacement signal 84 and for sending an actuation signal 88 to the pressure-regulated gas supply 74 for increasing or decreasing the gas pressure P within the chamber 54; (ix) wherein the pressure-regulated gas supply 74 and the controller 86 are configured for maintaining a constant gas pressure P within the chamber 54.

In this embodiment, the controller 86 may include instructions, wherein after the one or more cells 10 are disposed in a stacked arrangement within the battery cell placement volume 90 and an initial pressure is applied on the one or more cells 10 by the gas pressure P in the chamber 54, the instructions are executable for: (i) detecting an expansion E of the one or more battery cells 10 during a predetermined timespan T using the linear displacement sensor 66; (ii) if during the predetermined timespan T the detected expansion E is less than a maximum allowable expansion $E_{max}$ minus a predetermined measurement error Δ, then increasing the gas pressure P within the chamber 54; and (iii) if during the predetermined timespan T the detected expansion E is greater than the maximum allowable expansion $E_{max}$ plus the predetermined measurement error Δ, then decreasing the gas pressure P within the chamber 54. The instructions may be further executable for: (iv) if during the predetermined timespan T the detected expansion E is greater than a critical expansion amount $E_{crit}$, thereby defining a critical event, then providing one or more signals indicative of the critical event.

Turning now to FIG. 3, the method 100 for constant pressure regulation of one or more battery cells 10 is illustrated in flowchart form. This method 100 may be carried out using either of the embodiments shown in FIGS. 1-2, as well as other embodiments not shown. Beginning at block 110, the one or more battery cells 10 are disposed in a stacked arrangement within a battery cell placement volume 90 of an apparatus 20 configured to maintain a constant pressure on the one or more battery cells 10. At block 120, a gas pressure P is provided within a chamber 54 of the apparatus 20 (e.g., by a pressure-regulated gas supply 74), thereby causing an initial pressure to be applied on the one or more battery cells 10. At block 130, an expansion E of the one or more battery cells 10 is detected during a predetermined timespan T using a linear displacement sensor 66. At block 140, if during the predetermined timespan T the detected expansion E is less than a maximum allowable expansion $E_{max}$ minus a predetermined measurement error Δ (i.e., $E<E_{max}-Δ$), then the process flow routes to block 150 in which the gas pressure P within the chamber 54 is increased, and then the process flow routes back to just before block 130. However, if this condition is not met, then the process flow routes to block 160.

At block 160, if during the predetermined timespan T the detected expansion E is greater than a critical expansion amount $E_{crit}$ (i.e., $E>E_{crit}$), thereby defining a critical event, then the process flow routes to block 170 in which one or more signals may be provided that are indicative of the critical event, and then the process flow routes to block 180. (Alternatively, the critical event may be defined by the detected expansion E being greater than the critical expansion amount $E_{crit}$ plus the predetermined measurement error Δ; i.e., $E>E_{crit}+Δ$.) At block 180, if during the predetermined timespan T the detected expansion E is greater than the maximum allowable expansion $E_{max}$ plus the predetermined measurement error Δ (i.e., $E<E_{max}+Δ$), then the process flow routes to block 190 in which the gas pressure P within the chamber 54 is decreased, and then the process flow routes back to just before block 130. However, if this condition is not met, then the process flow routes to block 200.

At block 200, the gas pressure P within the chamber 54 is detected, and at block 210, if during the predetermined timespan T the gas pressure P is greater than a maximum allowable pressure $P_{max}$, then the process flow routes to block 220 in which gas is released from the chamber 54 until the gas pressure P is at or below the maximum allowable pressure $P_{max}$, and the process flow may route to block 230. This release of gas from the chamber 54, in response to the condition $P>P_{max}$, may be accomplished automatically by the pressure relief valve 62 and/or by the pressure regulator 76. Because this may be accomplished automatically, the cluster of blocks 210 and 220 may optionally occur at other places within the flowchart.

At block 230, if the execution of the process flow is still within the then-current predetermined timespan T, then a selected group of the process steps or flowchart blocks may be repeated for one or more additional cycles, until there is no more time left in the then-current timespan T to begin and complete another cycle. For example, at block 230, if the execution of the process flow is still within the then-current timespan T, the process flow may route back to just before block 130, and some or all of blocks 130-220 may be repeated for one or more additional cycles until there is not enough time left in the then-current cycle to begin and complete another cycle, at which point the process flow routes to block 240. (As one example, blocks 160-170 and 200-220 may be omitted or skipped, and at block 230 if the process flow is still within the then-current timespan T, then blocks 130-150 and 180-190 may be repeated.) And finally, at block 240, the timespan T is reset to begin again and the process flow routes once again to just before block 130, whereupon another timespan T commences. Alternatively, rather than blocks 130-220 being run for a plurality of times or cycles during a single predetermined timespan T, blocks 130-220 may be run only once per predetermined timespan T. In such a case, the predetermined timespan T may be 5 seconds, for example, and blocks 130-220 would only be run through once every 5 seconds.

In this method 100, the maximum allowable expansion $E_{max}$ (as well as the critical expansion amount $E_{crit}$) may be a function of at least one of a state of charge of the one or more battery cells 10, a state of health of the one or more battery cells 10, and a battery chemistry of the one or more battery cells 10. Additionally, during the predetermined timespan T, the one or more battery cells 10 may be in a charging state or in a discharging state.

The apparatus 20 used in this method 100 may include the first or second embodiments shown in FIGS. 1-2, or other embodiments not shown. Specifically, the apparatus 20 may include: (i) a bottom plate 22 having a top surface 24; (ii) a top plate 30 having opposed upper and lower surfaces 32, 34 and being disposed above and parallel to the bottom plate 22, wherein the top plate 30 is configured for constrained movement toward and away from the bottom plate 22, and wherein the battery cell placement volume 90 is defined between the top surface 24 of the bottom plate 22 and the lower surface 34 of the top plate 30; (iii) a support structure 40 having a lowermost surface 44 with a pocket 48 defined in the lowermost surface 44, wherein the top plate 30 is fitably disposed within the pocket 48 with the pocket 48 and the upper surface 32 of the top plate 30 defining the chamber 54, wherein the top plate 30 is sealably and vertically slidable against inner side walls 52 of the pocket 48; (iv) a passageway 56 defined within the support structure 40 in fluid communication between the chamber 54 and a port 64 disposed on an external surface of the support structure 40; (v) a pressure-regulated gas supply 74 in fluid communication with the port 64 for supplying gas to the chamber 54 and producing the gas pressure P within the chamber 54; (vi) a linear displacement sensor 66 operatively connected to the top plate 30 for measuring a vertical displacement of the top plate 30 and configured to produce a displacement signal 84 indicative of the vertical displacement; and (vii) a controller 86 configured for receiving the displacement signal 84 and for sending an actuation signal 88 to the pressure-regulated gas supply 74 for increasing or decreasing the gas pressure P within the chamber 54.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An apparatus for constant pressure regulation of one or more battery cells, comprising:
    a bottom plate having a top surface;
    a top plate having opposed upper and lower surfaces and being disposed above and parallel to the bottom plate, wherein the top plate is configured for constrained movement toward and away from the bottom plate, and wherein a battery cell placement volume is defined between the top surface of the bottom plate and the lower surface of the top plate;
    a support structure having a lowermost surface with a pocket defined in the lowermost surface, wherein the top plate is fitably disposed within the pocket with the pocket and the upper surface of the top plate defining a chamber, wherein the top plate is sealably and vertically slidable against inner side walls of the pocket;
    a passageway defined within the support structure in fluid communication between the chamber and a port disposed on an external surface of the support structure;
    a pressure-regulated gas supply in fluid communication with the port for supplying gas to the chamber and producing a gas pressure within the chamber;
    a linear displacement sensor operatively connected to the top plate for measuring a vertical displacement of the top plate and configured to produce a displacement signal indicative of the vertical displacement; and
    a controller configured for receiving the displacement signal and for sending an actuation signal to the pressure-regulated gas supply for increasing or decreasing the gas pressure within the chamber.

2. The apparatus of claim 1, wherein the vertical displacement of the top plate is indicative of an expansion of the one or more battery cells when the one or more battery cells are disposed within the battery cell placement volume.

3. The apparatus of claim 1, wherein the pressure-regulated gas supply and the controller are configured for maintaining a constant gas pressure within the chamber.

4. The apparatus of claim 1, wherein the pressure-regulated gas supply includes a pressure regulator and a pressurized gas source.

5. The apparatus of claim 1, wherein the linear displacement sensor is a linear variable differential transformer.

6. The apparatus of claim 1, wherein the linear displacement sensor is operatively connected to a shaft which sealably extends through an uppermost surface of the support structure and which is attached to the top plate within the chamber.

7. The apparatus of claim 1, wherein the linear displacement sensor is disposed on or adjacent to an outermost side surface of the support structure and is operatively connected to a connecting member which is attached to the top plate.

8. The apparatus of claim 1, further comprising:
a pressure relief valve disposed in fluid communication with the passageway for releasing gas from the chamber when the gas pressure is greater than a maximum allowable pressure.

9. The apparatus of claim 1, wherein the controller includes instructions, wherein after the one or more cells are disposed in a stacked arrangement within the battery cell placement volume and an initial pressure is applied on the one or more cells by the gas pressure in the chamber, the instructions are executable for:
detecting an expansion E of the one or more battery cells during a predetermined timespan T using the linear displacement sensor;
if during the predetermined timespan T the detected expansion E is less than a maximum allowable expansion $E_{max}$ minus a predetermined measurement error $\Delta$, then increasing the gas pressure within the chamber; and
if during the predetermined timespan T the detected expansion E is greater than the maximum allowable expansion $E_{max}$ plus the predetermined measurement error $\Delta$, then decreasing the gas pressure within the chamber.

10. The apparatus of claim 9, wherein the instructions are further executable for:
if during the predetermined timespan T the detected expansion E is greater than a critical expansion amount, thereby defining a critical event, then providing one or more signals indicative of the critical event.

11. An apparatus for constant pressure regulation of one or more battery cells, comprising:
a fixed bottom plate having a top surface;
a moveable top plate having opposed upper and lower surfaces and being disposed above and parallel to the bottom plate, wherein the top plate is configured for constrained movement toward and away from the bottom plate, and wherein a battery cell placement volume is defined between the top surface of the bottom plate and the lower surface of the top plate;
a fixed support structure having a lowermost surface with a pocket defined in the lowermost surface, wherein the top plate is fitably disposed within the pocket with the pocket and the upper surface of the top plate defining a chamber, wherein the top plate is sealably and vertically slidable against inner side walls of the pocket;
a passageway defined within the support structure in fluid communication between the chamber and a port disposed on an external surface of the support structure;
a pressure-regulated gas supply in fluid communication with the port for supplying gas to the chamber and producing a gas pressure within the chamber;
a pressure relief valve disposed in fluid communication with the passageway for releasing gas from the chamber when the gas pressure is greater than a maximum allowable pressure;
a linear displacement sensor operatively connected to the top plate for measuring a vertical displacement of the top plate and configured to produce a displacement signal indicative of the vertical displacement; and
a controller configured for receiving the displacement signal and for sending an actuation signal to the pressure-regulated gas supply for increasing or decreasing the gas pressure within the chamber;
wherein the pressure-regulated gas supply and the controller are configured for maintaining a constant gas pressure within the chamber.

12. The apparatus of claim 11, wherein the controller includes instructions, wherein after the one or more cells are disposed in a stacked arrangement within the battery cell placement volume and an initial pressure is applied on the one or more cells by the gas pressure in the chamber, the instructions are executable for:
detecting an expansion E of the one or more battery cells during a predetermined timespan T using the linear displacement sensor;
if during the predetermined timespan T the detected expansion E is less than a maximum allowable expansion $E_{max}$ minus a predetermined measurement error $\Delta$, then increasing the gas pressure within the chamber; and
if during the predetermined timespan T the detected expansion E is greater than the maximum allowable expansion $E_{max}$ plus the predetermined measurement error $\Delta$, then decreasing the gas pressure within the chamber.

13. The apparatus of claim 12, wherein the instructions are further executable for:
if during the predetermined timespan T the detected expansion E is greater than a critical expansion amount, thereby defining a critical event, then providing one or more signals indicative of the critical event.

* * * * *